US 6,657,861 B2

(12) United States Patent
Irmer

(10) Patent No.: US 6,657,861 B2
(45) Date of Patent: Dec. 2, 2003

(54) DISTRIBUTION CABINET

(75) Inventor: Günter Irmer, Berlin (DE)

(73) Assignee: Krone GmbH, Berlin (DE)

( * ) Notice: Subject to any disclaimer, the term of this patent is extended or adjusted under 35 U.S.C. 154(b) by 0 days.

(21) Appl. No.: 10/203,910

(22) PCT Filed: Feb. 20, 2001

(86) PCT No.: PCT/EP01/01890
§ 371 (c)(1),
(2), (4) Date: Aug. 15, 2002

(87) PCT Pub. No.: WO01/63997
PCT Pub. Date: Aug. 30, 2001

(65) Prior Publication Data
US 2003/0011988 A1 Jan. 16, 2003

(30) Foreign Application Priority Data
Feb. 23, 2000 (DE) ..................... 200 03 279 U

(51) Int. Cl.$^7$ ................................. H05K 7/20
(52) U.S. Cl. ................. 361/695; 211/26; 211/182; 312/223.1; 312/236; 312/265.3; 312/265.5; 312/265.6; 312/111; 312/108; 174/35 R; 361/703; 361/818; 361/831; 361/724; 361/826; 454/184
(58) Field of Search ................. 211/26, 181–183, 211/189, 191; 312/260–265.5, 257.1, 223.1, 111, 108, 326; 174/35 R; 361/600–605, 679, 690–695, 699–702, 704, 707, 724, 831, 839, 816, 818; 454/184

(56) References Cited

U.S. PATENT DOCUMENTS

| 4,949,218 A | * | 8/1990 | Blanchard et al. .......... 361/695 |
| 5,536,079 A | * | 7/1996 | Kostic ..................... 312/265.3 |
| 6,062,665 A | * | 5/2000 | Schneider et al. ....... 312/265.6 |
| 6,120,116 A | * | 9/2000 | Phillips .................. 312/223.2 |

FOREIGN PATENT DOCUMENTS

| DE | 75 28 226 | 4/1976 |
| DE | 81 07 658 | 7/1981 |
| DE | 198 07 804 | 9/1998 |
| DE | 199 10 520 | 9/1999 |
| EP | 0 514 668 | 11/1992 |
| WO | WO 97/34346 | 9/1997 |
| WO | WO 00/60713 | 10/2000 |

* cited by examiner

Primary Examiner—Gregory Thompson
(74) Attorney, Agent, or Firm—McGlew and Tuttle, P.C.

(57) ABSTRACT

A distribution cabinet (1) for accommodating weak-current distribution installations, in particular for arranging outdoors, having
  a base box (2),
  an outer cabinet body (3) with at least one door (4),
  a cabinet cover (5), and
  an inner installation frame (6),
the installation frame (6) being made up of profile sections (50), of which the cross-sectional shapes has two insertion pockets (51a,b), of which the insertion directions (52a,b) run at right angles to one another.

25 Claims, 9 Drawing Sheets

DISTRIBUTION CABINET

I. APPLICATION AREA

Figure 1:
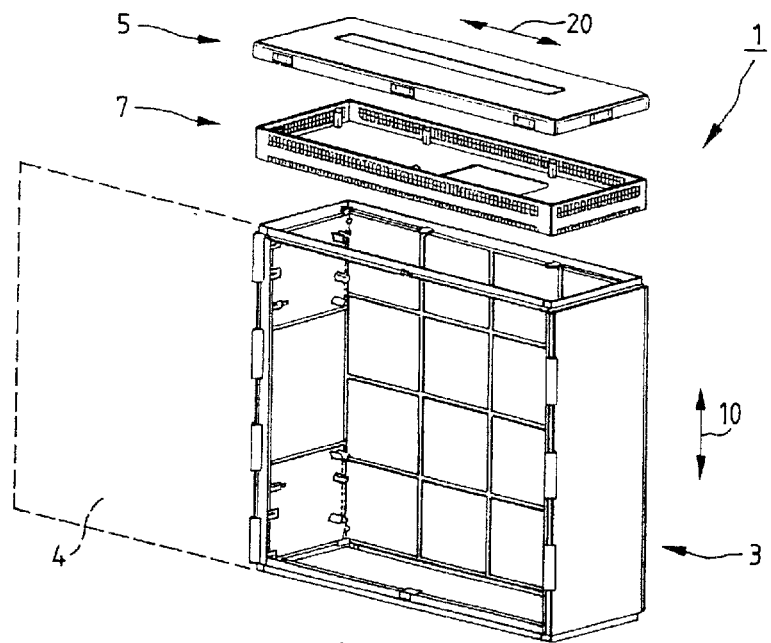
Figure 1:
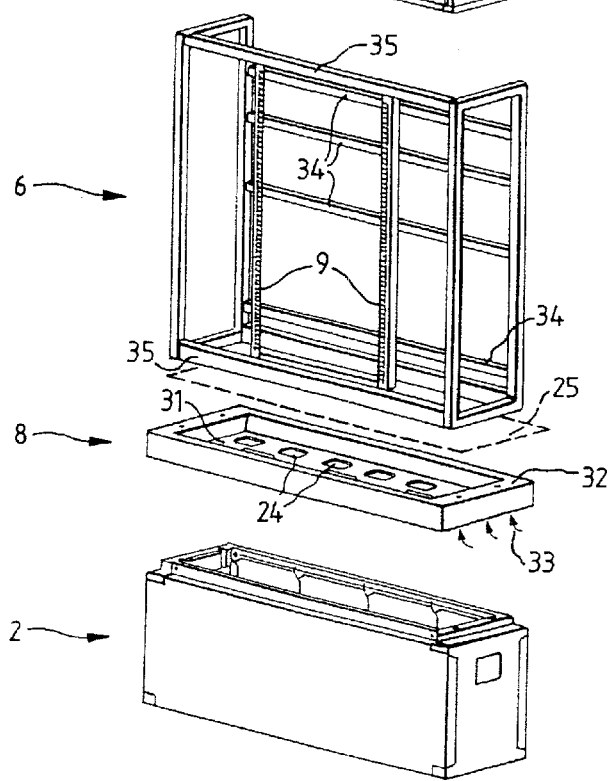

The invention relates to a distribution cabinet which is usually set up outdoors and accommodates the distribution installations for weak-current systems, for example telephone systems, with associated power-supply devices and cable-terminal/-connection devices for a certain area.

II. TECHNICAL BACKGROUND

Nowadays—in addition to having sufficient structural stability and resistance to vandalism, etc.—such distribution cabinets have to satisfy further requirements, for example excessive electromagnetic radiation must not be emitted to the surroundings, and, for use in warmer countries in particular, the temperatures in the interior of the distribution cabinet must not rise to too high a level, despite the heat-emitting electrical subassemblies accommodated there, nor must they drop to too low a level.

Such distribution cabinets are basically produced either from metal or from plastic, plastic combining the advantage of less expensive production with the advantage of an electrically non-conductive material, with the result that, even in the case of unplanned contact being established between the housing of the distribution cabinet and an electrical component, there is never a risk of a person who touches the housing from the outside receiving an electric shock.

As far as the sufficient cooling capability of such distribution cabinets is concerned, it is already known for cooling to be effected by air circulation. For this purpose—up until now only in the case of distribution cabinets consisting of sheet steel—the body is of double-walled configuration, it being possible for the ambient air to circulate in the interspace between the walls, that is to say to pass in at the bottom and to pass out at the top, as a result of which, on the one hand, the interior is heated up by the sunlight and, on the other hand, heat is dissipated on the inner wall, which are heated up by the electrical subassemblies in the main chamber.

Such a double-walled construction is indeed theoretically possible even in the case of distribution cabinets produced from plastic. However, on account of the greater wall thicknesses which are necessary in this case, and of the outer and inner dimensions being predetermined by standards in the various countries, this would result in excessively small free spaces on the inside and overall dimensions on the outside.

In addition, it is extremely important for such distribution cabinets not to exceed the admissible maximum value of electromagnetic radiation emitted to the outside, that is to say for the EMC (electromagnetic compatibility) to be ensured.

III. DESCRIPTION OF THE INVENTION a) Technical Object

The object of the present invention is thus to provide a distribution cabinet and an assembly kit for producing such a distribution cabinet, the distribution cabinet consisting at least partially of plastic and nevertheless providing sufficiently good shielding against electromagnetic radiation, on the one hand, and a sufficient cooling capability, on the other hand.

b) Solution of the Object

This object is achieved by the features of claim 1. Advantageous embodiments can be gathered from the subclaims.

Up until now, distribution cabinets produced from plastic usually comprised a base box, which was usually open on the top side and also on the underside, since the underground cables were introduced into the base unit, a body, which was positioned on the base and on which one or two doors or flaps for opening the body were provided, for the purpose of installing or maintaining and checking the electrical units in the interior of the body, and a cover protecting the body, open on the top side, and one upward against rain and other influences, and usually positioned in a sealed manner.

It was additionally possible for the body to have a base plate as an integral or separate component which—apart from the through-passages for the cables—separated off the main chamber in the interior of the body from the base chamber.

A distribution cabinet according to the invention may be produced from these known components by the addition of an installation frame which is made up, in particular, of deflected sections of an endless profile. The specific integration of the profile makes it possible, on the one hand, to simplify the assembly to form a—three-dimensional—installation frame to a very considerable extent and, in addition, to facilitate the optional fitting of EMC shielding and/or the production of a double-shell wall of the distribution cabinet for ventilation and cooling purposes.

The profile here—as seen in cross section—preferably has an approximately rectangular cross section, in particular two continuous outer surfaces running at right angles to one another. The other two, inwardly oriented outer surfaces each have an insertion pocket which is open on the outside and is intended for the insertion of insertion panels, of which the insertion direction is arranged parallel to the continuous outer surfaces and which are preferably also arranged as far as possible in the outward direction in the profile side surface thereof.

This preferably produces a cross-sectionally continuous hollow-chamber profile in the inner corner of the profile, this stabilizing the profile, in particular when the cross-sectional shape of the hollow chamber has one or more recesses, preferably directed outward.

In the case of essentially constant wall thicknesses being provided, these recesses are produced, on the one hand, by the already mentioned insertion pockets and, on the other hand, by at least one, preferably precisely one further pocket 57, which extends parallel to one of the insertion pockets and is open in the outward direction, but has undercuts, preferably arranged symmetrically in relation to one another in both flanks. These undercuts are used for arranging embracing a groove nut therein.

This configuration makes it possible, on the one hand, for three such profile sections to be connected to one another relatively easily to form a three-dimensional corner connection:

This takes place by two profile sections being cut to length and mitered and positioned one against the other. This three-dimensional corner connection is secured by an angle which is pushed, by way of its legs, into the open ends—from the miter—of the undercut of the pocket and is fixed there by means of, for example, clamping screws or else is fastened on the outsides of the two profile sections.

Since this angle or a groove nut has a threaded bore in the direction of the third, as yet missing, angle profile, this third angle can be positioned flush on the first two angles, which are already connected to one another, and fixed against the angle or the groove nut by means of a clamping screw, which is arranged in the longitudinal direction of the pocket, and within this pocket of the third profile, and can be screwed into the threaded bore of the angle or of the groove nut. This clamping screw is secured in its longitudinal direction in the third profile with the aid of a transversely running threaded bolt arranged in a transverse bore or with the aid of other means.

All of the additional elements necessary for the corner connection are located within the cross section of the three corner-forming profile sections.

It is possible for the profile configuration, furthermore, to be used very easily in order to complete the installation frame, formed from the profile sections, in that appropriately cut-to-size insertion panels are inserted into the insertion pockets, with the result that the respective side of the installation frame is a more or less closed side, that is to say when the panels are continuous panels which do not have any through-passages.

If the EMC shielding is to be achieved by means of the insertion panels, these panels will consist of metal or will have metallic components as a coating or addition, if the panels themselves consist of plastic. In addition, an EMC seal is then preferably positioned between the edges of the panels and the grooves of the insertion pockets accommodating them. Shielding made of a woven fabric or perforated metal sheets may also be utilized through placement outside the installation frame and/or inside the cabinet body.

These panels, however, may also serve for forming the inner shell of a double-shell distribution cabinet, the outer body forming the outer shell. The air space provided therebetween serves for ventilation and cooling purposes in that—since the air space is open at the top and bottom—on account of the chimney effect air, preferably from the surroundings, flows in at the bottom and flows out at the top and is transported away in the interspace, in particular from the outer wall, which is irradiated by the sun. For reasons of cost and for heating-up reasons, the outer wall will preferably consist of plastic here.

It is thus possible, with the aid of a corresponding assembly kit, for the installation frame, which is located in the interior of the outer body, to be used not just for arranging the electrical components, but also for optional fitting with EMC shielding, with a second, inner shell for the purpose of a ventilated double-shell cabinet housing, it also being possible for both these things to be functionally combined by corresponding panels.

Irrespective of this, a further improvement may be provided by completion by means of further components, it being the case in particular—in contrast to the previously described, known components—that additional parts for supplementary purposes, rather than still having to consist of plastic, [lacuna] also [lacuna] of other materials, for example aluminum or sheet steel, in particular of high-grade steel, be this for reasons of shielding against electromagnetic radiation (EMC shielding) or for reasons of thermal conductivity.

Such an additional part may be formed by a top intermediate part, which is positioned between the top border of the body and the cover, which closes off the top, in particular in a sealed manner in relation to the body. This top intermediate part serves occasionally for heating purposes, but mostly for additional temperature reduction in the interior of the main chamber, that is to say in the interior of the body, and thus of the installation frame in the this interior is cooled by means of the top intermediate part, to be precise, depending on requirements, in different ways:

On the top intermediate part, which, in addition to a border running all the way round the outside, also has a false floor, which preferably seals the main chamber of the body in the upward direction, one or more bottom cooling structures may be fastened on the underside of the false floor, that is to say also, in certain circumstances, also projecting some way into the main chamber of the body. These cooling structures extract heat from the air circulating in the interior of the main chamber as it passes along beneath the ceiling, that is to say the underside of the false floor, in that said cooling structure—usually a ribbed structure—gives off its heat, by heat conduction, to the interior of the false floor, which is likewise a good heat conductor, the structure being fixed to the false floor or even possibly integrally formed therewith.

The top intermediate part itself, rather than being sealed, above its false floor, in the direction of the surroundings, has openings, for example slots which are arranged in the side borders and allow ambient air to pass in and out, said ambient air dissipating heat as it passes along the top side of the false floor. This can be enhanced if, in turn, a top cooling structure is arranged on the top side of the false floor, preferably at the same location as the bottom cooling structure. It is also possible for the top and bottom cooling structures to be formed integrally with one another and to be arranged in a sealed manner in a corresponding through-passage of the false floor.

This effect is more pronounced as the surface area of the cooling structure increases, for which reason said cooling structure will usually cover more than half, for example two thirds or three quarters of, the surface area of the false floor.

In order to optimize the passage of air along the cooling ribs on the top side of the false floor, it is advantageous, in particular, for these cooling ribs to be arranged—as seen in the plan view of the top side of the top intermediate part—in particular radially in star form, for example extending away from the center of the false floor, and for the region around the geometrical crossover point of these radially running cooling ribs to be left free in order for a passive, that is to say non-driven, radial-flow impeller to be arranged there such that it can be rotated about a vertical axis. The radial-flow impeller in this case has blades which are curved arcuately in plan view in particular.

By virtue of such an arrangement—in particular if a sufficient number of ventilation slots of a sufficient size are provided all the way round the side borders of the top intermediate part, level with the cooling ribs and/or the fan—the impeller is driven by wind blown into the ventilation slots from the outside, and thus, on the opposite sides, forces air radially outward between the cooling ribs, as a result of which outside air constantly passes over a particularly large number of cooling ribs.

In addition, a functional opening is optionally arranged in the false floor, it being possible for said opening to be closed firmly by a functional cover, or for the functional cover thereof to be opened by hand or else automatically, namely when a certain threshold temperature in the interior of the main chamber is exceeded, or for said functional opening to serve instead, or in addition, for accommodating further components.

The functional parts which are inserted into the functional opening—it being immaterial here whether the functional parts extend more above or beneath the false floor in a vertical direction—may be an inserted air filter with an EMC filter, for passive cooling of the main chamber with the functional opening open, or else an active, electrically operated fan, which then extracts warm air by suction, through the functional opening, from the interior of the body, or else the above-described passive fan, which is then preferably placed vertically above the false floor, forces [lacuna] into the region above the false floor of the top intermediate part and, through the openings provided there, into the surroundings.

It is also possible to insert an air/air heat exchanger, which preferably has open primary and secondary circuits in each case, air from the main chamber, that is to say from the body, flowing through one circuit, while air from the region above the false floor, that is to say ambient air from the outside, flows through the other circuit. The air from the main chamber is thus always separated from the ambient air and sealed from the latter, with the result that the penetration of contaminants is prevented.

The flow of the two types of air through the respective open circuits of the heat exchanger may be assisted on one or on both sides in each case by driven, preferably electrically operated, fans. It is also possible for just one of the two circuits to be provided, while the other circuit is absent, and the other type of air just flows over a correspondingly large outer surface area of the heat exchanger and feeds and dissipates heat via conduction.

Another additional part may be formed by an—in particular specifically configured—installation frame in the interior of the body. The installation frame is preferably a self-supporting frame which is made up of aluminum profiles, runs in the vicinity of the inside of the body, has a high level of stability, and on which the electrical subassemblies are fastened and connected to the cables.

For this purpose, the installation frame is preferably of cuboidal configuration with open side surfaces, the profiles running along all the edges of the cuboid. It is preferable here for the horizontally running transverse struts at the top, rear edge—as seen from the front doors of the body—to be offset downward, in order for it to be possible for necessary installations to be better fixed there.

In the front surface of the installation frame, a rectangular, vertically upright two-dimensional frame is additionally provided as a mounting rack, which is arranged on the top and bottom front transverse struts of the installation frame such that it can be displaced in the horizontal direction. The electrical subassemblies are fastened on said mounting rack and can thus be positioned in accordance with the position of the cables, running in from beneath, by virtue of the mounting rack being displaced. It is also possible for more than one such mounting rack to be provided in the installation frame.

Otherwise, all the outer surfaces of the installation frame are open, and are not closed over the surface area. In addition, the distribution cabinet has EMC shielding, which can be realized in different ways, but always has to consist of a material which does not allow electromagnetic radiation to pass through.

This material may be added, in a sufficient concentration, to the plastic of which the body and/or the doors and/or the cover and/or the base, etc. consist, or the abovementioned plastic parts may be provided on the inside with a coating which contains this material, or consists of this material, or the main chamber is lined with a woven fabric of this material, or with metal sheets or perforated metal sheets of this material, at least on its peripheral sides, preferably also at the bottom and top.

The fastening in the two last-mentioned cases may be provided either on the insides of the body or of the doors or on the outsides of the installation frame.

It is particularly advantageous here for the installation frame to be fastened not on the body but exclusively on the base, or on the bottom intermediate part positioned on the base, and, in addition, for no undercuts—as seen in the transverse direction—to be permitted between the installation frame and body.

This is intended to allow existing distribution cabinets to be converted without operation being interrupted in that the electrical components which are fixed and connected in the installation frame remain there and, in addition, need not be disconnected, but the cover and body can nevertheless be raised off in the upward direction.

This is often necessary in order to exchange the damaged body, or in order to exchange the body for another type of body, for example an EMC-proof body, or in order for it to be possible to install EMC shielding between the outside of the installation frame and the inside of the body and then to place the old body in position again.

A further additional part is formed by the bottom additional part, which is positioned between the base box, which is open at the top, and the bottom border of the body or of the installation frame.

This bottom intermediate part is likewise of tray-like design again, with a false floor and a peripheral border, and openings are likewise provided again in order to allow ambient air to penetrate into the region beneath the false floor.

The configuration selected here is preferably one in which, in the top region of the base box, the outer wall of the latter is set back inward, and a horizontal spacing, serving as an opening, thus remains between said wall of the base box and the outer border of the bottom intermediate part, with the result that said opening cannot be seen from the side or laterally at the top. The same principle can also be applied for the top intermediate part.

The false floor of the intermediate part, rather than being completely closed, has a plurality of cable through-passage openings distributed over its surface, it being possible for said openings optionally to be closed by covers which have a sealing action, on the one hand, against contamination, but also against electromagnetic radiation. For this reason, the bottom intermediate part and the covers closing the cable through-passage opening, in turn, is also produced from an EMC-shielding material, for example aluminum.

In addition, it is also possible for the false floor of said bottom intermediate part to have one or more functional openings, which may analogously serve the same purposes, and thus for the installation of the same functional parts, as have been described with reference to the top intermediate part.

For this reason, it is possible for the false floor to be located either in the top height region of the vertical extent of said bottom intermediate part, if said functional parts are positioned beneath the false floor, or the other way round—and this is the preferred embodiment—in the bottom region of the vertical extent, in order to provide space, above the false floor, for arranging such functional parts as a fan, which, for power-supply purposes, has to be connected to the electrical subassemblies of the main chamber and, in addition, requires space.

By virtue of adding one or more of the above-mentioned additional parts or additional measures to the already known components, it is possible to produce, depending on the use purpose, the specific distribution cabinet from this assembly kit.

c) Exemplary Embodiments

Figure 2:
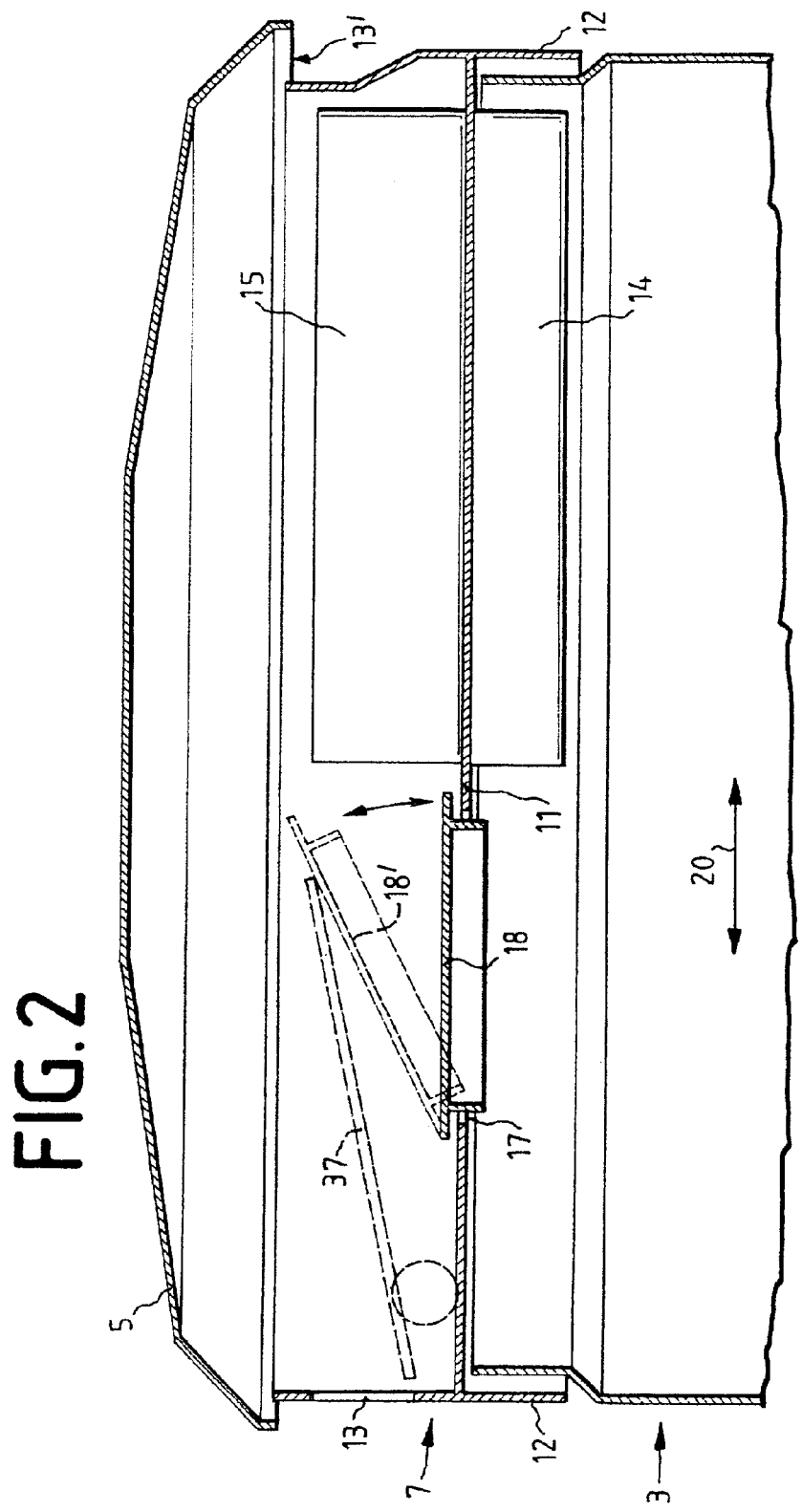
Figure 3:
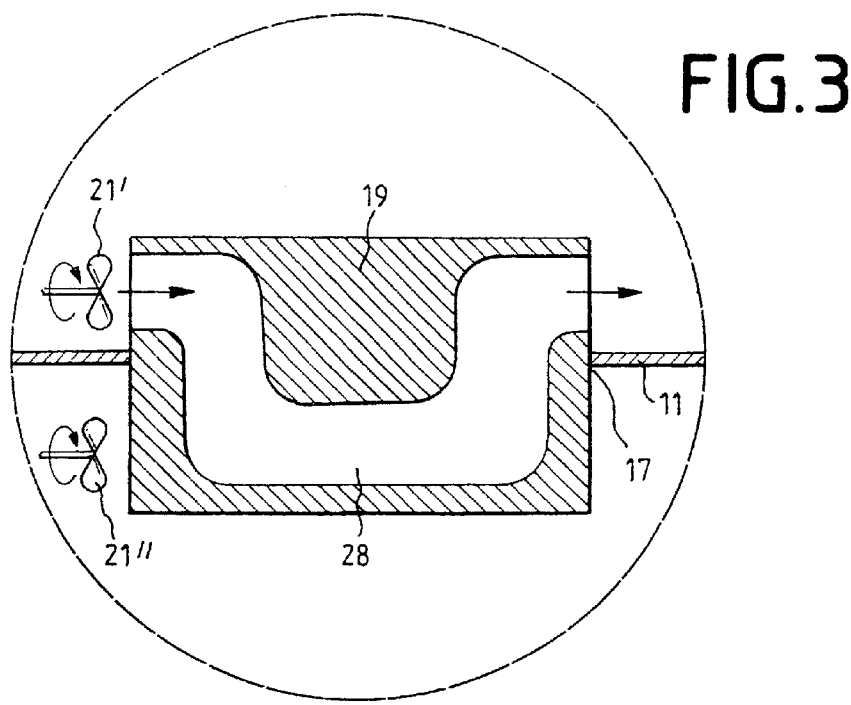
Figure 4:
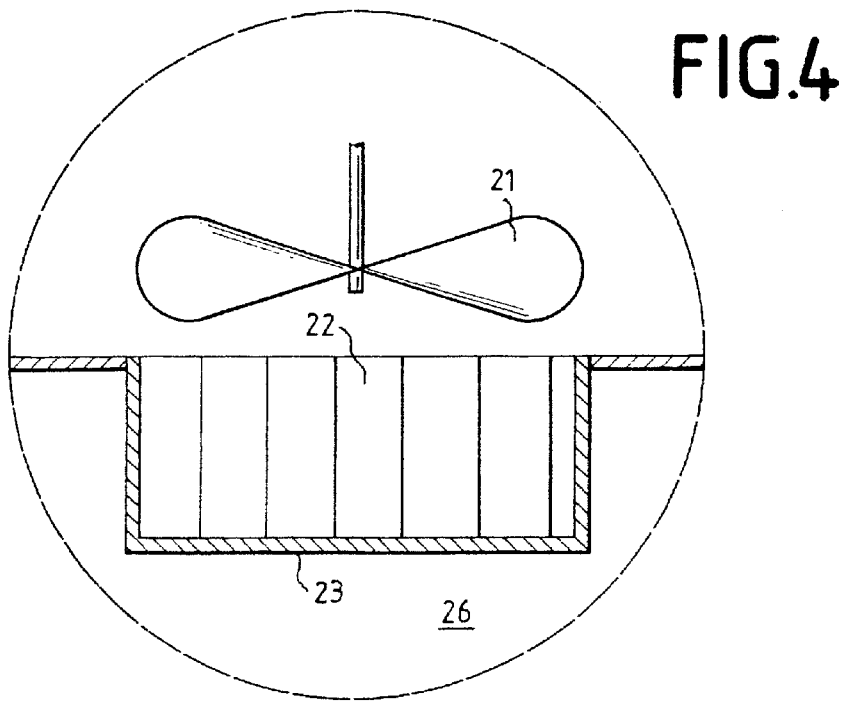
Figure 5:
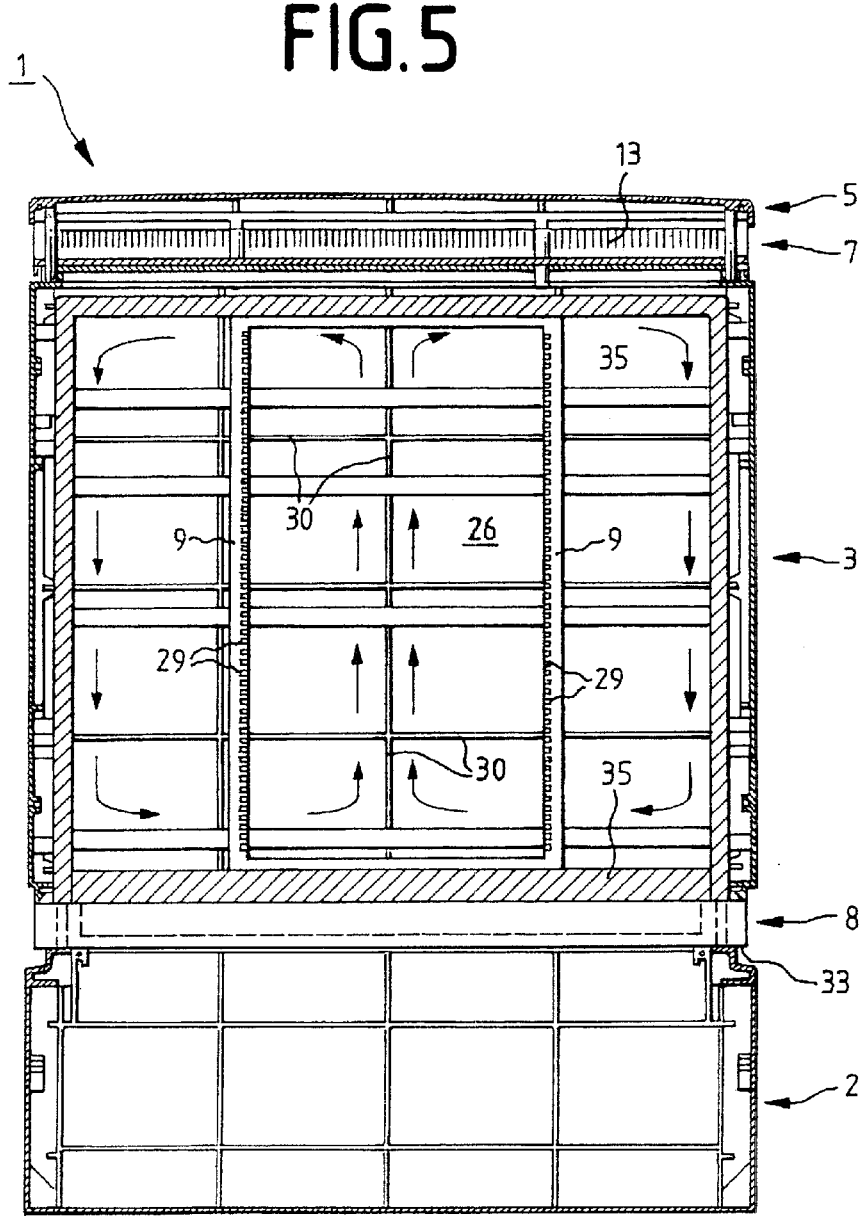
Figure 6A:
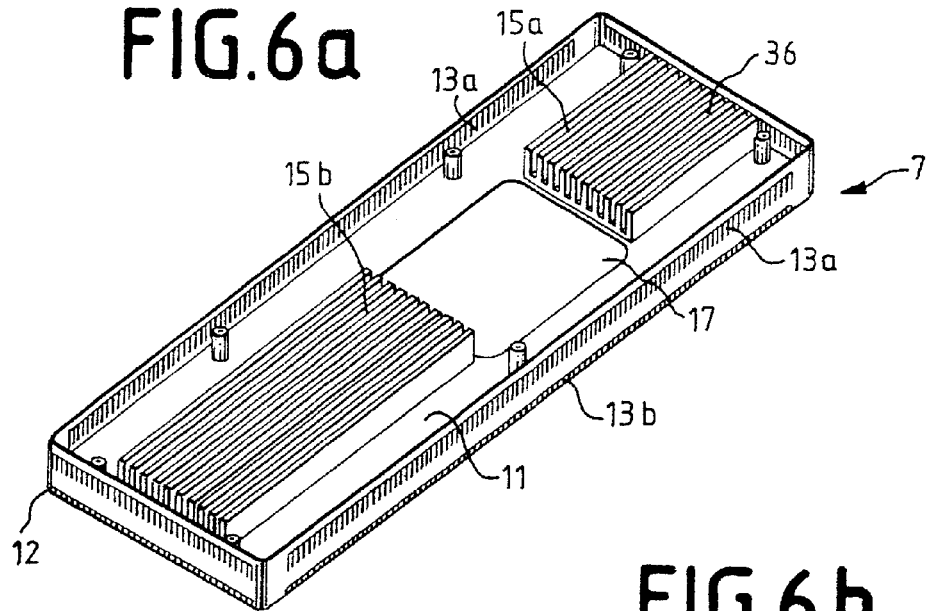
Figure 6B:
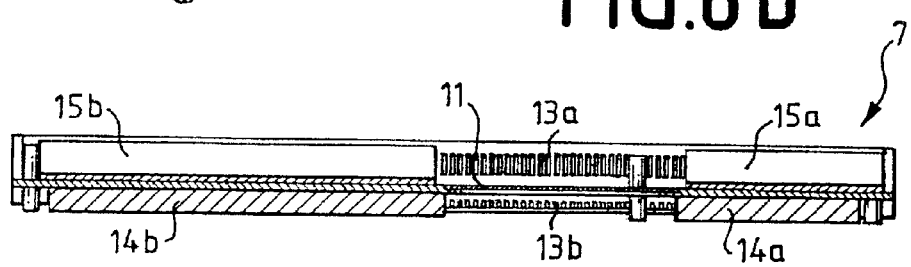
Figure 7:
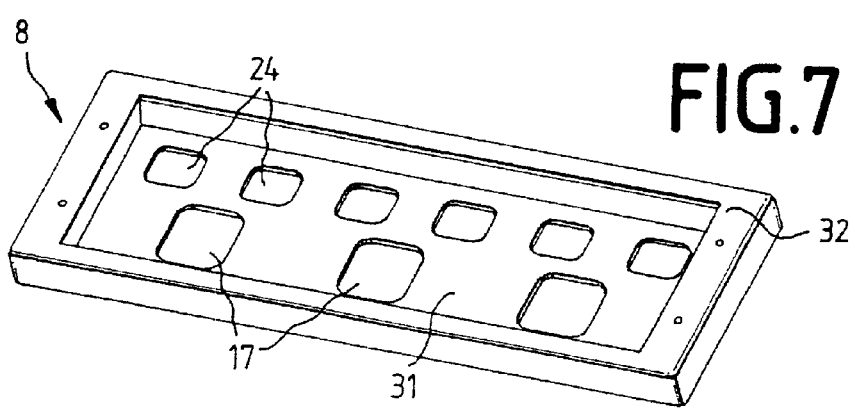
Figure 8:
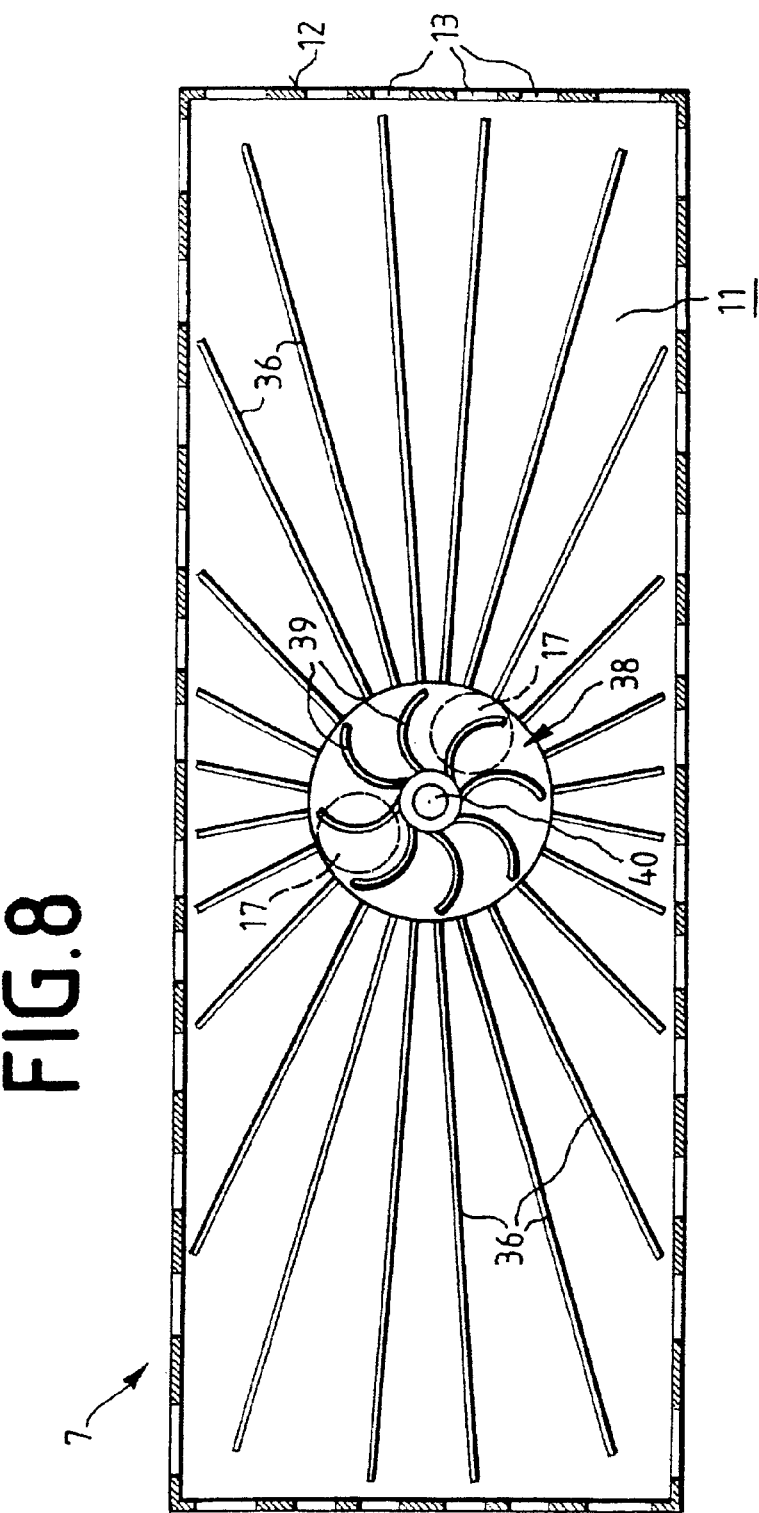
Figure 9A:
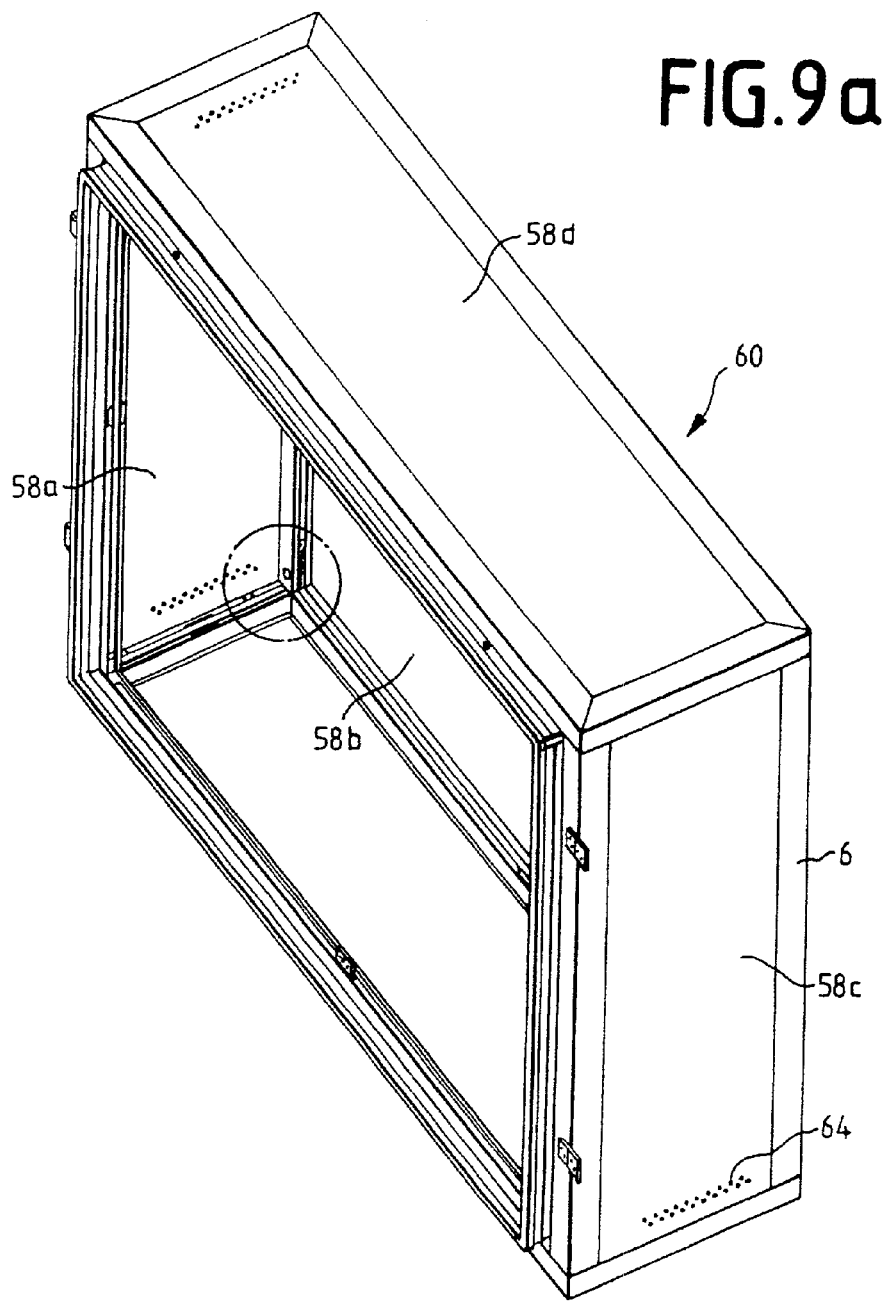
Figure 9B:
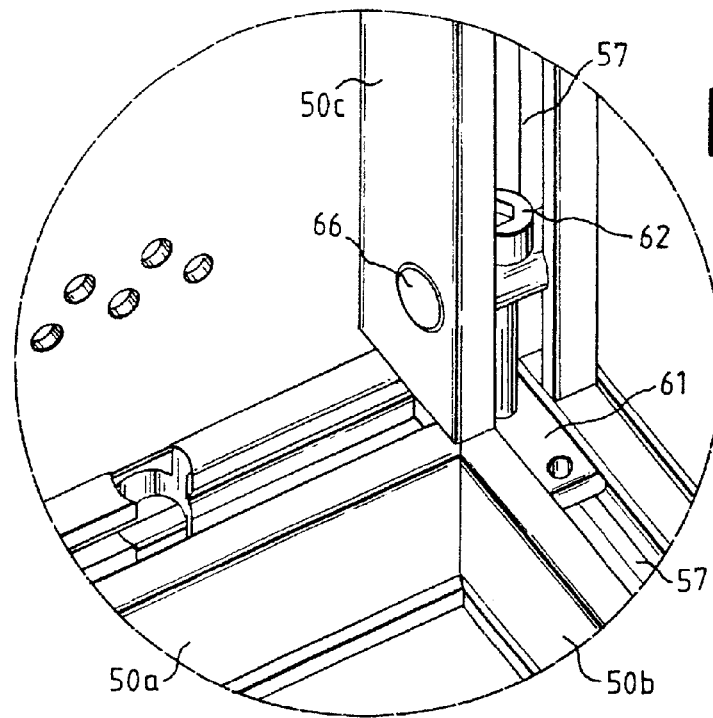
Figure 9C:
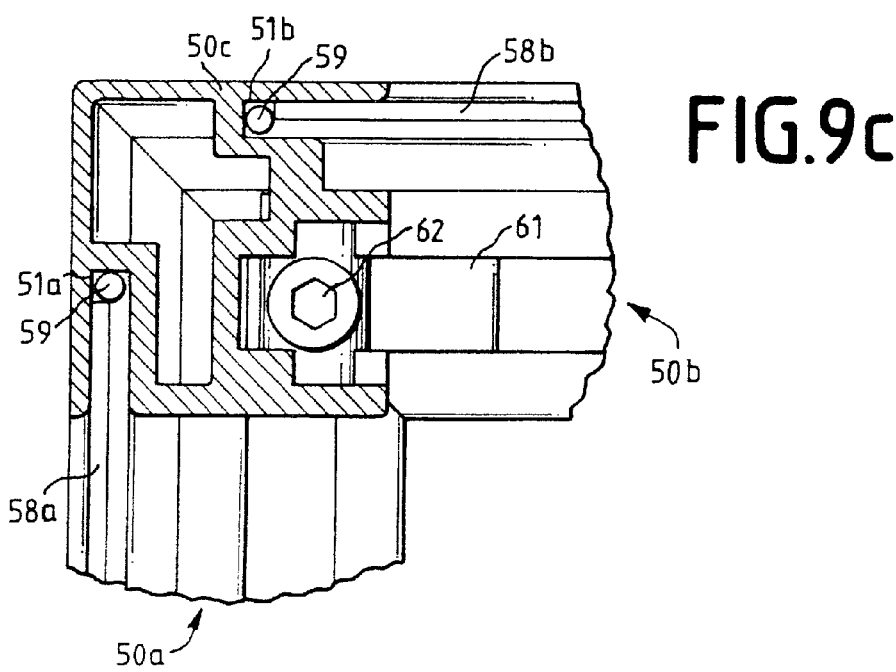
Figure 10:
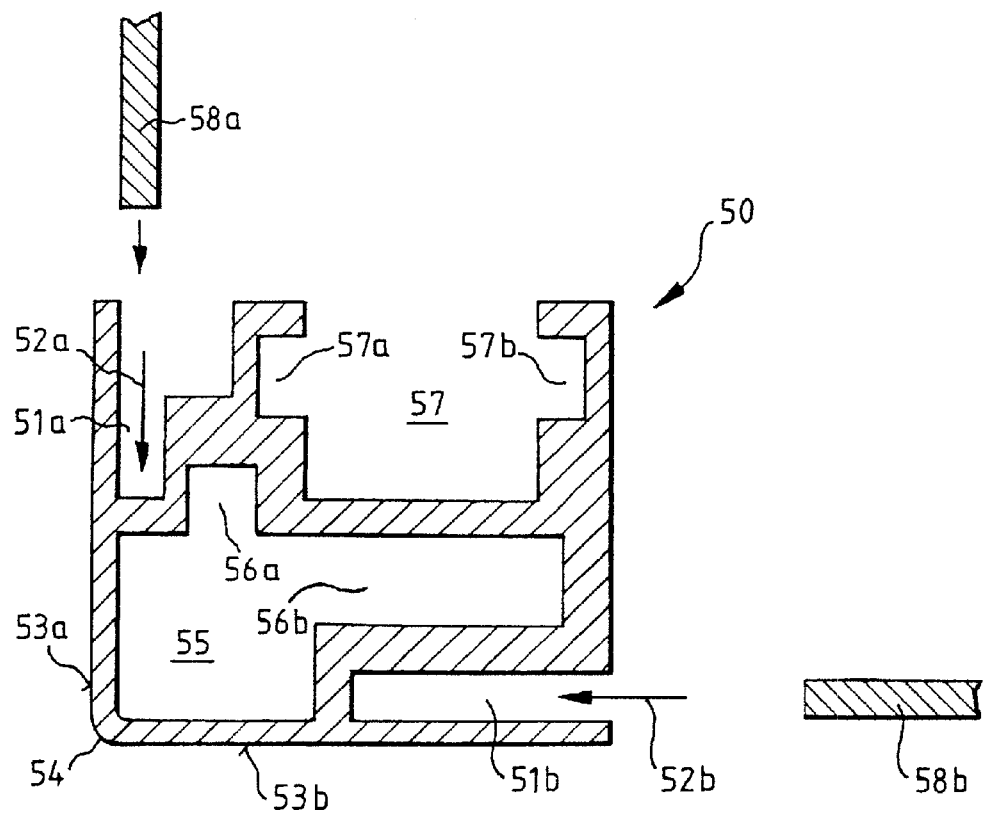

An embodiment according to the invention is described in more detail by way of example hereinbelow with reference to the figures, in which:

FIG. 1 shows an exploded illustration of the distribution cabinet according to the invention, FIG. 2 shows an illustration of a vertical section through the top part of the distribution cabinet, FIG. 3 shows an illustration of a vertical section through the functional opening of the top intermediate part and through a functional part inserted there, FIG. 4 shows another functional part inserted at this location, FIG. 5 shows a vertical section through the finished distribution cabinet, FIGS. 6a & 6b shows illustrations in detail form of the top intermediate part, FIG. 7 shows the bottom intermediate part, FIG. 8 shows a plan view of another top intermediate part, FIGS. 9a–9c show the installation frame comprising profile sections, and FIG. 10 shows an illustration in detail form of the cross section of the profile sections.

FIG. 1 shows the individual components which make up the distribution cabinet—in the non-fitted-out state —in an exploded illustration, that is to say drawn apart from one another in the vertical longitudinal direction 10 of the distribution cabinet.

The base box 2 is a box which is open at the top and bottom and has walls along the entire periphery, the box, in the installed state, partially projecting from the ground, and the underground electric lines being introduced into the distribution cabinet from beneath through said box. The front side of the latter can be opened.

The side-wall outer surfaces which are set back inward in the top end region can be seen here, as is also the case in FIG. 5 in particular.

By virtue of the bottom intermediate part 8, which comprises sheet metal, in particular aluminum, being positioned on the base box 2, the outer periphery of said bottom intermediate part being equal to, or slightly greater than, the base box 2, downwardly oriented inlet openings 33 are produced between the bottom edges of the border 32 of the bottom tray-like intermediate part 8, said border running all the way round the outside, and the top end region of the base box 2 provided said bottom intermediate part 8, rather than resting on the entire periphery of the top border of the base box 2, only rests on certain sections thereof, for example only in the corner regions.

These openings for the passage of the ambient air into the main chamber 26 are necessary, in particular, if air is extracted from the main chamber 26 by suction at some other location, e.g. in the top region via a top intermediate part.

For this purpose, it is possible, for example, for the border 32 of the intermediate part 8, as seen in cross section, to be of approximately U-shaped configuration with the open side oriented downward, the inner vertical or obliquely vertically running leg thereof then merging into the horizontal false floor 31 on two or four sides.

In the low-level false floor 31 of the tray-like intermediate part 8, it is possible to see the cable through-passage openings 24, which are lined up in a row in the transverse direction—see FIG. 7 in particular—and can be closed in an EMC-proof and also dust-proof manner by closure covers—not illustrated. Three functional openings 17 are arranged in a second, parallel row in the false floor 31.

The body 3, which can be opened and closed on the front side by one or two doors 4, which are only indicated in FIG. 1, is fitted on the bottom intermediate part 8.

The installation frame 6, which is illustrated therebeneath, is located completely within the body 3 in the assembled state of the distribution cabinet, as is illustrated in the section in FIG. 5, and is fixed, preferably screwed, to the base box 2 and to the body 3 via the bottom intermediate part 8, screw connection, moreover, being the preferred method of connection between all the components of the distribution box.

On the sides and on the rear wall, the body 3 has continuous panel-like walls which are stiffened on the inside by ribs 30, etc., it being possible for the body 3 to be in one piece or made up of different parts.

The at least one door 4, which like the body 3 is produced from plastic, namely as in injection molding, in particular by structural foam molding, is articulated on the body 3 via hinges and has a lock, in order to prevent unauthorized individuals from opening it.

The body 3 is open on the top side and also on the underside, but can be closed, to the greatest extent, on the underside by a base plate 25, which may have cutouts for individual cables which are to be led through, as is indicated in FIG. 1.

The base plate 25 is used either instead of the bottom intermediate part 8, in order to prevent, in particular, sealing against penetrating dust and also to provide EMC shielding, but also in addition to the bottom intermediate part 8, if, for example, the bottom intermediate part 8 consists of plastic and does not provide any EMC shielding.

In this case, the base plate of the body 3 is designed as EMC shielding.

The installation frame 6 is located in the interior of the body 3 and is dimensioned such that, to the greatest extent, it fills the interior of the latter. The installation frame 6 comprises a latticework of struts which preferably run along the edges of the cuboidal overall contour of the installation frame 6.

It is merely the rear top transverse strut 34, which runs in a horizontal transverse direction 20, which is offset downward, this constituting one of four transverse struts 34 located one above the other on the rear side of the installation frame which serves for the fitting of power-supply devices, cable-terminal devices, etc.

Apart from along the edges, the open side surfaces of the installation frame are not provided with additional struts either horizontally or transversely. The same also applies to the front of the installation frame. There, a mounting rack 9 in the form of a rectangular, two-dimensional, vertical frame is additionally mounted in a displaceable manner in a displaceable manner on the top and bottom transverse struts of the front side of the installation frame 6 in order for it to be possible to change the position, for example in accordance with the position of the required cables.

At a later stage—with the distribution cabinet 1 finished and the door 4 open—the fitter fastens the electrical subassemblies on said mounting rack 9 in that the vertical struts of the mounting rack 9 are at a standard spacing apart from one another and have standard fastening parts or rows of holes 29 for the screw connection of the electrical subassemblies.

It is also possible to arrange in the interior of the installation frame 6, that is to say in the main chamber of the distribution cabinet 1, additional electrical units, for example a control means, in dependence on the interior temperature in the main chamber for the cooling—be this active or passive, as will be described hereinbelow.

Fitted on the open top side of the body 3 is the top intermediate part 7, which—like the bottom intermediate part 8—is only a few centimeters high, with the result that the bottom and top intermediate parts 7 and 8 together only increase the overall height of the distribution cabinet 1 by a total of not more than 15 cm in relation to the state of said cabinet without these intermediate parts.

The top intermediate part 7 is fitted in a close-fitting manner on the body 3 and is itself, in turn, covered in the upward direction by the cover of the distribution cabinet 1, said cover being positioned on the top intermediate part 7.

The basic construction of the top intermediate part 7 can better be seen in FIG. 2, which shows an illustration of a vertical section through the top region of the distribution cabinet 1.

It can be seen here that the top intermediate part 7, which on account of the thermal conductivity and of the EMC shielding preferably consists of aluminum, has a false floor 11 which is enclosed by a peripheral border 12, the false floor 11 here preferably being located rather in the bottom height region of the essentially vertically upright border 12. The cover 5 is positioned on the top end surface of said top intermediate part 7.

The right-hand half of FIG. 2 shows a bottom cooling structure 14 and a top cooling structure 15 projecting in the upward and downward directions from the false floor 11, the cooling ribs of said cooling structures nevertheless preferably running transversely to the viewing direction, that is to say in the transverse direction 20 of the distribution cabinet 1.

This is based on the idea that air circulates constantly in the interior of the main chamber 26, that is to say of the body 3, this being driven by the heat-emitting electrical subassemblies which are installed there, and are installed in the mounting rack in particular.

At the location at which these electrical subassemblies are located, the air is heated and rises (see FIG. 5), while, in the regions of the main frame which are remote therefrom, in particular the border regions, it descends along the inner surfaces of the walls of the body.

Beneath the bottom end of the main chamber, that is to say beneath the false floor 11 of the top intermediate part 7, said false floor being seated in a close-fitting manner on the body 3, the air thus flows along essentially horizontally, and thus along the cooling ribs 36 of the bottom cooling structure 14, which thus extracts heat from the air from the main chamber.

For this purpose, the cooling structures 14, 15 consist of a material which is a good heat conductor, in particular likewise of aluminum. By virtue of surface-area abutment with, and connection to, the underside of the false floor 11, the bottom cooling structure 14 gives off its heat to the false floor 11. Since a top cooling structure 15 is installed at the same location, in turn, above said bottom cooling structure, this top cooling structure, over its entire surface area, in particular its likewise provided cooling ribs 36, gives off heat to that air which passes into the interior of the top intermediate part 7 above the false floor 11, from the surroundings, via the slots 13 and passes out at some other location again via the analogous slots 13.

The achieves the dissipation of heat exclusively via thermal conduction from the main chamber 26 into the region above the false floor 11 without there having to be an open connection between the two which allows the penetration of water or contaminants into the main chamber.

For the air to pass in and out, it is possible for the slots 13 either, as is illustrated in the left-hand half of FIG. 2, to be formed in the vertically upright border 12 or, as can be seen in the right-hand half of FIG. 2, covered from the top and to the side, to be produced in that the border 12 of the intermediate part 7 is set back inward at least in certain sections in the radial direction, and the outer border of the cover 5 seated thereabove thus projects further outward, and it is also the case that the cover 5 is seated on the intermediate part 7, and fastened, in particular screw-connected, there, not over the entire periphery but likewise only in certain sections, and definitely not in the regions of the set-back border 12.

FIG. 2 also illustrates a functional opening 17 in the false floor 11 in the region alongside the cooling structures 14 and 15, the functional opening in FIG. 2 being closed by a functional cover 18, which provides both sealing against penetrating water and contamination as well as the same EMC shielding as the false floor 11 itself.

This is provided if the dissipation of heat from the main chamber by means of the abovedescribed coolers 14 and/or 15 is sufficient for the respective use purpose or use location of the distribution cabinet.

If additional measures, for example active ventilation of the main chamber 26 or active cooling of the air of the main chamber, is necessary, the functional cover 18 is removed and the functional opening 17 is thus opened up in order for it to be possible to accommodate various functional parts here:

FIG. 2 illustrates, by dashed lines, a functional cover 18' which can be opened and closed, is retained, for example, on one side of the functional opening 17 by means of a hinge and can be opened automatically and with sensor control by means of an electrically operated drive 37, for example via a pinion and rack. This allows the heated air from the main chamber which is accumulating beneath the false floor 11 to escape upward out of said main chamber, for which purpose it is necessary for cool air to flow in afterward, preferably via the base box 2 and/or the inlet openings 33, between the base box 2 and bottom intermediate part 8, into the functional chamber 26.

In order to prevent electromagnetic radiation from passing out through the open functional opening 17, and/or moisture or other contaminants from penetrating through the same, the functional opening 17 is closed by means of a dust and moisture filter 22 and of an EMC filter 23, these both nevertheless being air-permeable.

Such a combined air/EMC filter 22/23 is depicted in the enlarged illustration in detail form of the functional opening 17 in FIG. 4, in which case an electrically driven fan 21, that is to say an impeller, additionally extracts the air by suction in the upward direction from the main chamber 26.

FIG. 3 shows a further possible means, namely a heat exchanger 19, which is seated in the functional opening 17 and is thus connected to the main chamber 26, on the one hand, and also to the chamber above the false floor 11. Here too, the heat exchanger 19 is arranged in a sealed manner in the functional opening 17, with the result that it is not possible here for any air to be exchanged between the main chamber 26 and the chamber above the false floor 11.

The heat exchanger from FIG. 3 only has one open circuit, namely for the air above the false floor 11, which is forced through lines 28, preferably with the aid of a fan 21', from one side to the other. The lines 28 through which this air is moved are, in particular, bent at right angles and extend into the region beneath the false floor 11 and thus down into the main chamber 26. The air from the main chamber 26 can pass over them directly there either in an actively driven manner via a further fan 21" positioned there or the air is guided in the main chamber 26—with or without said fan 21" in the main chamber—in turn, by pipelines—not illustrated—which are connected for thermal conduction to the pipelines 28 of the first circuit.

Instead of the abovedescribed air/air heat exchanger, it is also possible to use an air/water heat exchanger, in the case of which, instead of the air being used above the false floor 11, use is made of water or some other liquid refrigerant, which then nevertheless has to be pump-circulated and is cooled, in turn, by the ambient air flowing along, this passing into the top intermediate part 7 in the region above the false floor 11.

FIGS. 6a and b show, in a perspective illustration and in cross section, a further variant of a top intermediate part 7. This differs by way of an approximately central functional opening 17 and cooling structures which are arranged on both sides in this respect, that is to say two top and two bottom cooling structures 14 and 15. Furthermore, rather than just one row of slots 13 being provided all the way round the border 12, two rows 13a, b are provided one above the other, one row being located above the false floor 11 and one row being located beneath the same.

This results in two different possible uses:

Depending on whether or not the top border of the wall of the body 3 is installed within the border 12 of the top intermediate part 7 such that it butts in a close-fitting manner against the underside of the false floor 11 of said top intermediate part, the slots 13b of said bottom row ventilate the main chamber 26 directly in the outward direction or not.

FIG. 8 shows a plan view of a top intermediate part 7 which has a rectangular outline and is enclosed by a peripheral, upwardly projecting side border 12 in which there are located—preferably vertically upright—slots 13, which are intended to allow ambient air to pass in and have the highest possible surface area—preferably more than 50%—in relation to the overall surface area of the side border 12.

At one location—preferably in the center—a radial-flow impeller 38 is arranged on the false floor 11, which forms the plane of the drawing of FIG. 8, such that it can be rotate about an axis 40, which is located perpendicularly to the false floor 11. The blades 39 of the impeller 38 here are curved arcuately in order, in the case of lateral oncoming flow, always to effect a preferred direction of rotation and, in the direction opposite the direction of oncoming flow, to force the air radially outward.

Arranged radially around the region of the impeller, and preferably extending as close as possible to the impeller 38, are cooling ribs 36 which project up from the false floor 11, run radially outward in star form and thus, on the one hand, have the outside air which flows against the impeller passing over them and, on the other hand, on the opposite side, have the air which is forced radially outward by the impeller 38 passing over them, this assisting the cooling of the cooling ribs 36.

The same design or an analogous design—that is to say radial arrangement of the cooling ribs and a rotatably mounted impeller—may be found on the underside of the false floor 11, the underside not being visible in FIG. 8, as in both cases the impellers are preferably not driven, that is to say are passive, and are only driven by the air flowing against them—beneath the false floor, then, by circulation occurring there in the interior of the body.

It is additionally possible for the impeller located above the false floor 11 and the impeller located beneath the false floor 11 to be connected into one another in a rotationally fixed manner via a common shaft, as a result of which, despite the sealed false floor 11, the impeller 38 located above the false floor, and driven by the outside air, assists the circulation in the region beneath the false floor 11, that is to say in the sealed part of the body.

It is likewise possible—preferably in the region of the impeller 38—for one or more functional openings 17 to be arranged for example as circular openings arranged in star form around the axis of the impeller, in order to provide a through-passage opening for air from the region beneath the false floor 11 into the region above the same. In this case, the impeller is designed as a combined axial-flow/radial-flow impeller, in order for the warm air located beneath the false floor 11 to be taken upward by suction in the axial direction of the impeller.

It is possible here, as has been described above, for the functional openings 17 to be sealed by EMC filters, dust filters, etc. and also to be closed by openable covers, in this case on the underside of the functional openings 17, if there is only one impeller located on the top side of the false floor 11.

FIG. 9a shows the installation frame 6 which has been completed to form an inner housing and, with the aid of insertion panels 58a,b,c, etc. inserted there, is open on all sides apart from the front side (door side) and underside (cable seat). Perforations 64 can be seen in the insertion panels of the side parts, the perforations serving for dissipating warm air to the outside of the insertion panels (58) and transporting it away outward in the upward direction by way of the air flowing along there.

In the finished state, the inner housing, as is illustrated in FIG. 9a, is enclosed by an outer body 3, with a spacing between the two.

The doors, which close the front side but are not illustrated in FIG. 9a, may likewise be of double-walled design.

If the insertion panels 58a,b,c, etc. serve for EMC shielding in contrast, or serve for EMC shielding in addition, perforations 64—in dependence on the limit values which are to be maintained—will not be admissible since it is precisely through these perforations that electromagnetic radiation could pass out of the inner housing. Since the outer body 3 preferably consists of plastic, the latter does not provide any further shielding for the EMC radiation.

In the finished state, furthermore, the underside of the installation frame 6 is closed by a base plate 25, which is indicated in FIG. 1, to the extent where there are only narrow through-passages there for the underground cables which are to be introduced from beneath, but otherwise EMC shielding is provided.

FIGS. 9b & 9c and 10 shows, in a horizontal section and a perspective illustration, the corner connection produced front three profile sections 50a,b,c. The cross section of the profile, which can also be seen in FIG. 9c, can better be seen in FIG. 10: the profile is rectangular, virtually square, in cross section, and has two continuous outer surfaces 53a, 53b adjacent to one another. Insertion pockets 51a,b are arranged on the inside of these two outer surfaces, for the insertion of correspondingly dimensioned insertion panels 58a,b, as can better be seen in FIG. 9c.

The insertion direction of these insertion pockets is parallel to the continuous outer surfaces 53a,b and, correspondingly, these insertion directions 52a,b are likewise at right angles to one another.

A further pocket 57 is additionally arranged on one of the non-continuous outer sides, that is to say with an insertion direction parallel to the insertion direction 52a of the one insertion pocket 51a. This additional pocket 57, in its flanks, has symmetrically provided undercuts 57a,b, which is used for positioning and bracing a conventional groove nut 61, as is illustrated by way of example in FIG. 9b.

The free space still remaining within the profile cross section between the outer surfaces 53a,b, and the walls of the latter, and the pockets 51a,b and 57 forms, in the corner region, a hollow chamber 55 which is continuous on all sides in cross section, and is thus very torsionally rigid, and has additional recesses 56a,b, which additionally increases the rigidity. In this case, one recess 56b projects between the inner end of the pocket 57 and the side of one insertion pocket 51b.

The perspective illustration of FIG. 9b shows the production of a corner connection:

First of all two profile sections 50a,b are mitered and positioned one against the other by way of said miters and connected. The miter here is arranged such that the opening of the pocket 57 with the undercuts 57a,b is located in the plane defined by the two profiles 50a,b, which are positioned at an angle one against the other.

The connection is produced by an angle which fits into the undercuts 57a,b and, by way of its free ends, is pushed into the free ends of the mitered undercuts 57a,b, as is known per se.

It is also possible, however, for the angle to be fastened on the outside of the two profile sections positioned one against the other at a miter joint, said outside not being visible in FIG. 9b. In this case, a groove nut 61 is positioned in the miter-formed corner region of the undercuts 57a,b.

This makes it possible for a third profile section 50c to be positioned flush on the main plane, from the open side of the pocket 57, at right angles to said main plane of the first two profile sections 50a,b, with the result that the outer surfaces 53a,b of all three profile sections form a right-angled three-dimensional external corner. The pocket 57 of the third section 50c here is aligned with the pocket 57 of one of the other two profile sections 50a and 50b. Additionally running in this pocket 57 within the profile 50c, and in the longitudinal direction of the latter, is a clamping screw 62, which has its thread screwed into the threaded bore 63 of the angle or of the groove nut 61. The clamping screw is secured in a form-fitting manner in relation to the profile 50c by means of a transverse bolt 66, which is inserted into the corresponding bore in a direction transverse to the profile and which has the clamping screw 62 passing through it.

By virtue of the clamping screw being tightened, it is not just the case that the third profile 50c is braced in relation to the other two profiles 50a,b; the angle or the groove nut 61 is also braced against the undercuts 57a,b in the pockets 57 of the first two profiles 50a,b.

A complete corner connection is thus realized just by means of a single clamping screw 62.

The transverse bores for the transverse bolts 66 here may preferably be already prefabricated in all the profiles 50a,b,c, as can be seen on the profile 50a.

FIG. 9c additionally shows that, when insertion panels 58a,b are positioned in the insertion pockets 51a,b provided for this purpose, an EMC shield 59 is provided between the panels and groove base.

This demonstrates that, with the aid of a specifically configured profile from which the installation frame is formed, both a double-walled housing with good ventilation and, or instead, a housing with inner EMC shielding can optionally be produced very easily.

The insertion panels will preferably consist of aluminum, which is suitable, on the one hand, EMC sealing and, on the other hand, good conductivity for the heat developed in the interior.

The outer housing (body 3), which cannot be seen in FIGS. 9a,b,c, and 10, may be of an inherently stable construction or have its individual parts (rear wall, side walls, doors, etc.) Fastened separately in each case on the installation frame 6, but with the spacing therebetween, by means of spacers, fastening plates, hinges or similar known components. It is even possible for the outer body to be configured from sheet metal, if this is the express wish of a customer, despite the disadvantageous technical and thermal effects.

| LIST OF DESIGNATIONS | |
|---|---|
| 1 | Distribution cabinet |
| 2 | Base box |
| 3 | Body |
| 4 | Door |
| 5 | Cover |
| 6 | Installation frame |
| 7 | Top intermediate part |
| 8 | Bottom intermediate part |
| 9 | Mounting rack |
| 10 | Vertical longitudinal direction |
| 11 | False floor |
| 12 | Border |
| 13 | Slots |
| 14 | Bottom cooling structure |
| 15 | Top cooling structure |
| 16 | Cooling ribs |
| 17 | Functional opening |
| 18 | Functional cover |
| 19 | Heat exchanger |
| 20 | Transverse direction |
| 21 | Fan |
| 22 | Air filter |
| 23 | EMC filter |
| 24 | Cable through-passage opening |
| 25 | Base plate |
| 26 | Main chamber |
| 27 | Functional opening |
| 28 | Lines |
| 29 | Row of holes |
| 30 | Rib |
| 31 | False floor |
| 32 | Border |
| 33 | Inlet openings |
| 34 | Transverse struts |
| 35 | Transverse struts |
| 36 | Cooling ribs |
| 37 | Drive |
| 38 | Impeller |
| 39 | Blade |
| 40 | Axis |
| 50 | Profile sections |
| 51a, b | Insertion pockets |
| 52a, b | Insertion directions |
| 53a, b | Outer surface |
| 54 | External corner |
| 55 | Hollow chamber |
| 56a, b | Recess |
| 57 | Pocket |
| 57a, b | Undercuts |
| 58a, b | Insertion panel |
| 59 | EMC seal |
| 60 | Inner body |
| 61 | Groove nut |
| 62 | Clamping screw |
| 63 | Threaded bore |
| 64 | Charge |
| 66 | Transverse bolt |

What is claimed is:

1. A distribution cabinet for accommodating weak-current distribution installations, in particular for arranging outdoors, the distribution cabinet comprising:

a base box;

an outer cabinet body with at least one door, the outer cabinet body being connected to said base box;

a cabinet cover connected to said outer cabinet body; and an inner installation frame within said cabinet body made up of profile sections having cross-sectional shapes with two insertion pockets providing insertion directions running at right angles to one another.

2. The distribution cabinet as claimed in claim 1, wherein outer surfaces of the profile sections having outer surfaces running parallel to the insertion directions, are planar and continuous and merge one into the other in an external corner.

3. The distribution cabinet as claimed in claim 1, wherein, on an inside of an external corner, said at least one profile section has a hollow chamber which is continuous, as seen in cross section, and has at least one groove.

4. The distribution cabinet as claimed in claim 1, wherein, on an outer surface which is directed away from other outer surfaces, at lease one profile section has a further open pocket in the form of an undercut groove having an insertion direction parallel to one of the insertion pockets, said undercut grove being arranged on each side in a centrally symmetrical manner in flanks of said packet.

5. The distribution cabinet as claimed in claim 1, wherein correspondingly dimensioned insertion panels are inserted in said insertion pockets of said profile sections assembled to form said installation frame wherein said installation frame forms an inner body which said frame is substantially enclosed by said outer cabinet box apart from the door side of said cabinet box.

6. The distribution cabinet as claimed in claim 5, wherein the insertion panels are formed of EMC-shielding material with sheet steel or sheet aluminum, and in each case one EMC seal is arranged between the insertion panels and the base of said insertion pockets.

7. The distribution cabinet as claimed in claim 1, wherein a connection of three said profile sections forms a three-dimensional corner wherein two profile sections are mitered and positioned one against the other and are connected by means of a groove nut or of an angle positioned in the undercuts and clamped there, and the third profile section is positioned flush on said corner connection and screwed thereto by means of a clamping screw, the clamping screw being screwed into a threaded bore made in the corner of the angle or of the groove nut.

8. The distribution cabinet as claimed in claim 5, wherein between said inner body and said outer cabinet body there is an air space which is open at top and bottom regions in the direction of the surroundings and serves for air to rise and thus heat to be dissipated from the inside of said outer cabinet body.

9. The distribution cabinet as claimed in claim 1, further comprising:
a top intermediate part arranged between a top border of said cabinet body and said cabinet cover, at least one of said cabinet body and said base box and said cabinet cover and said at least one door consist of plastic and are produced as a plastic injection molding.

10. The distribution cabinet as claimed in claim 9, wherein said installation frame is arranged in an interior of said cabinet body for accommodating electrical subassemblies and said installation frame as seen in a transverse direction does not have any undercuts with said cabinet body such that said cabinet body may be raised off in an upward direction despite said installation frame with all the components fastened to said base box remaining on said base box.

11. The distribution cabinet as claimed in claim 9, further comprising a frame-like mounting rack for fastening the electrical subassemblies arranged in a horizontally displaceable manner along said installation frame.

12. An assembly kit for producing a distribution cabinet which serves for accommodating weak-current distribution installations and is to be set up outdoors, the assembly kit comprising:
a base box;
an outer cabinet body with at least one door;
a cabinet cover made of plastic;
an installation frame insertable within said outer cabinet body, said installation frame including profile sections, each of said profile section having at least two insertion pockets which extend away from one another at an angle; and
an insertion panel for insertion into the insertion pockets of the profile sections.

13. The assembly kit as claimed in claim 12, wherein said insertion panel is dimensioned such that together with the installation frame said insertion panel forms at least one continuous outer surface as an inner housing within said outer cabinet body.

14. The assembly kit as claimed in claim 12, further comprising at least one additional part which can be arranged on said body and said additional part is a top intermediate part which can be arranged between a top border of said cabinet body and said cover.

15. The assembly kit as claimed in claim 12, wherein said profile sections have a cross section which is constant in the longitudinal direction.

16. The distribution cabinet as claimed in claim 1, wherein said installation frame arranged in an interior of said cabinet body for accommodating electrical subassemblies, said installation frame as seen in the transverse direction, does not have any undercuts with said cabinet body such that said cabinet body may be raised off in the upward direction despite the position of said installation frame with all the components fastened on said base box.

17. The distribution cabinet as claimed in claim 1, wherein said distribution cabinet has a bottom intermediate part arranged between a bottom border of said installation frame and a top border of said base box and has a top intermediate part and said bottom intermediate part is formed of one of aluminum and some other material which inhibits electromagnetic radiation.

18. The distribution cabinet as claimed in claim 1, wherein said distribution cabinet has a bottom intermediate part arranged between a bottom border of said installation frame and a top border of said base box and has a top intermediate part and said top intermediate part has at least one false floor and a vertically upright border running all the way round the sides and with said cabinet body and said cover disposed in position, said top intermediate part has slot openings for the ambient air to flow in and out in said border above said false floor.

19. The distribution cabinet as claimed in claim 1, further comprising:
a bottom intermediate part arranged between a bottom border of said installation frame and a top border of said base box; and
a top intermediate part having at least one false floor and at least one bottom cooling structure arranged on said false floor in close abutment against said false floor, said bottom cooling structure projecting downward, in a direction of said cabinet body and having a large surface area with cooling ribs made of a material with good thermal conductivity or aluminum and a top cooling structure arranged in particular at the same location as said bottom cooling structure but on a to side of said false floor in close abutment against said false floor, being formed of a material with good conductivity or aluminum and having a large surface area with cooling ribs, and being substantially identical to said bottom cooling structure, cooling ribs of the top and/or bottom cooling structure respectively running in a horizontal transverse direction of the distribution cabinet.

20. The distribution cabinet as claimed in claim 1, further comprising:
- a top intermediate part with cooling ribs provided on a top or bottom cooling body of said top intermediate part running radially, as seen in plan view, and with a central region in relation to the geometrical point of contact with the cooling ribs; and
- a radial-flow impeller with blades bent in the plan view, the impeller being arranged in a state in which it is mounted such that it can be rotated about a vertically upright axis with the cooling bodies extending over more than half a basic surface area of the top intermediate part.

21. The distribution cabinet as claimed in claim 1, further comprising:
- a top intermediate part with slots at a transition between said top intermediate part and said cover produced, by the cover being placed in position and a border set back inward in certain sections in relation to the cover positioned thereon with resulting slots overlapped in a horizontal direction by the cover.

22. The distribution cabinet as claimed in claim 1, further comprising: a top intermediate part having at least one false floor, wherein arranged in the false floor there is a functional opening for the insertion of a multiplicity of functional parts including one or more of an automatically closable functional cover, a heat exchanger, a fan, an air filter, a EMC filter, said false floor having a plurality of cable through-passage openings distributed over its surface.

23. The distribution cabinet as claimed in claim 1, further comprising a bottom intermediate part of tray-like design with a false floor, a peripheral body, air-inlet openings, with the false floor of the bottom intermediate part arranged in the bottom height region of a border and having a functional opening for fastening a multiplicity of functional elements therein.

24. The distribution cabinet as claimed in claim 1, further comprising a bottom intermediate part wherein a border open at a bottom has outlet openings produced by the bottom intermediate part being positioned on said base box and a top border of said base box is set back inward at least partially in a radial direction in relation to the bottom border of the bottom intermediate part.

25. The distribution cabinet as claimed in claim 1, further comprising EMC shielding disposed about a main chamber in an interior of said cabinet body said EMC shielding is provided in said cabinet body or on inner surfaces of said cabinet body or on outer surfaces of said installation frame and, in addition, top and bottom horizontal surfaces of said body being shielded, with the top horizontal shielding being effected by a top intermediate part and/or bottom horizontal shielding being effected by a bottom intermediate part and with bottom horizontal EMC shielding effected by a base plate made of a material which shields electromagnetic radiation and is fastened on said cabinet body and said EMC shielding consists of a material addition to the plastic of the body, of a coating of the inner surfaces of the body or of a woven fabric or of metal sheets, in particular perforated metal sheets, which are fitted, in particular, on the outsides of the installation frame and/or the insides of the cabinet body or of the door and the shield including metals which inhibit electromagnetic radiation.

* * * * *